April 15, 1930.  N. A. HALLWOOD  1,754,359
SCALE
Filed May 17, 1926  5 Sheets-Sheet 3

Inventor
Nathan A. Hallwood
By
Attorney

April 15, 1930.  N. A. HALLWOOD  1,754,359
SCALE
Filed May 17, 1926  5 Sheets-Sheet 5

Inventor
Nathan A. Hallwood
By
Attorney

Patented Apr. 15, 1930

1,754,359

UNITED STATES PATENT OFFICE

NATHAN A. HALLWOOD, OF COLUMBUS, OHIO

SCALE

Application filed May 17, 1926. Serial No. 109,514.

This invention relates to improvements in scales, and is particularly directed to scales of the type utilizing springs to resist the flexion of a beam structure from neutral position.

The invention has for one of its principal objects the provision of a scale wherein the weight receiver thereof is supported by a compound beam structure consisting of a pair of opposed levers pivotally supported at their outer ends and having the adjacent or inner ends thereof united by a pivoted link, the said levers having associated therewith oppositely acting coil springs, the arrangement of such springs serving to oscillate the levers in opposite directions so as to place the link connection therebetween under tensile stress and to permit the beam structure, as a whole, to be sensitively balanced in a normal or neutral position and, also, to enable the springs to resist the flexion of the beam structure to a variable extent from said normal position.

Another object of the invention resides in combining with the beam structure an improved means for operating an associated indicator mechanism, wherein said means consists of a pivoted member slightly overbalanced at one end and cooperative with the beam structure so that when the latter is moved from neutral position, by the sudden application of weight to the receiver, the said means will be released to allow its pivoted member to swing slowly, by responding to the influence of its weighted end, until contacting with the beam structure in its deflected position, wherein movement of the weight indicating and operating means is arrested. By this construction the operation of the weight indicating means takes place somewhat more slowly than the operation of the beam structure, but avoids the use of a direct connection between the beam structure and the indicating means so that the latter will be relieved of the shock and jar imparted to the scale by the sudden application of bodies upon its weight receiver.

A further object of the invention resides in providing a weight indicating mechanism comprising a rotatable drum structure and wherein the drum structure is rotatably carried by a movable or swinging support, in order that the operating gearing, employed in rotating the drum structure, may be continuously maintained under conditions of constant pressure necessary in effecting the free support and rotation of the drum structure without involving undue frictional pressure on the gearing in any position of operation on the part of the drum structure and its operating means.

With these and other objects in view, as will appear as the description proceeds, the invention consists in the novel features of construction, combinations of elements and arrangements of parts hereinafter to be fully described and pointed out in the appended claims.

Referring more particularly to the drawings the numeral 1 designates the base of the improved scale comprising the present invention. Connected with and arranged over the base 1 is a housing 2, providing an interior chamber 3 in which is arranged the operating and indicating mechanisms of the scale. Arranged in horizontal planes immediately over the top of the housing is a suitable form of weight receiver 4, from which depends spaced pairs of vertical stems 5 and 6, which operate through openings provided in the top of the housing and limit the travel of the receiver to a vertical plane.

The stems 6 protrude into the casing 3 and have their lower ends notched so as to rest upon inverted, fixed knife edges 7, projecting laterally from the upper lever element 8 of a compound beam structure B. The element 8 has its outer end provided with fixed laterally extending, edge trunnions 9 which are receivable within supporting blocks 10 carried in connection with the upper end of vertically disposed supports 11, arising from the base 1 and permanently fixed thereto.

Midway of its length the lever element 8 is pivotally connected as at 12 with the upper end of the stem 13 of a dash pot 14, employed for the usual purpose of stabilizing the oscillation of the beam structure.

Figure 8:
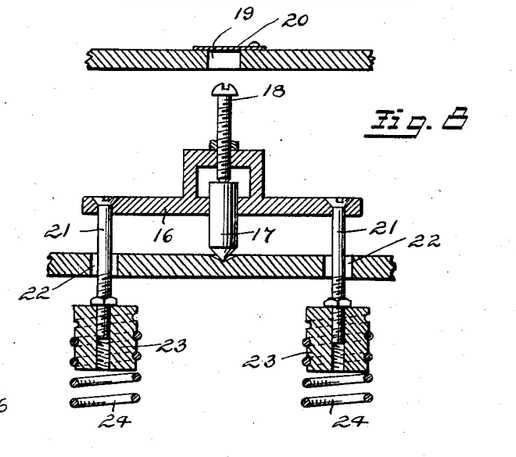
Figure 8 is a vertical transverse sectional view disclosing the mechanism for supporting and adjusting the springs of the upper lever of the beam structure.

To maintain the lever element in a normal or neutral position, the base 1 is provided with an upright frame 15, above which is disposed a horizontally extending bar 16, provided centrally with a stop pin 17, having its lower pointed end, as shown in Figure 8, engaged with the recess in the top of the frame 15. The bar 17, in turn, carries a vertically disposed screw 18 having its headed end arranged immediately under an opening 19 provided in the top of the housing 2, and which opening is normally covered by a closure 20. It will be seen that by rotating the screw 18 vertical movement may be imparted to the bar 16 to govern its operating positions.

Figures 4, 5:
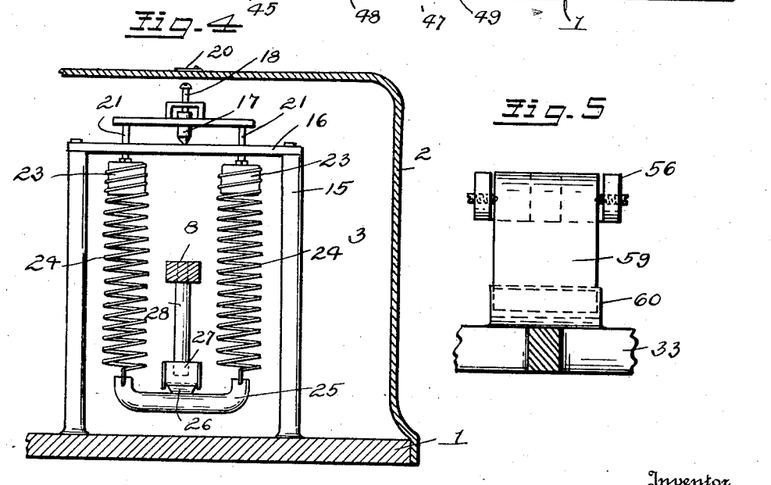
Figure 4 is a similar view on the line 4—4 of Figure 1.
Figure 5 is a detail view disclosing the weighted end of the pivoted operating rack for the indicator drum.

Connected with the outer end of the bar 16 is a pair of depending screws 21, arranged to pass through enlarged openings 22 provided in the top of the frame 15. The screws 21 at their lower ends are engaged threadedly with heads 23, with which are connected the upper ends of a pair of transversely spaced, vertically disposed coil springs 24. The lower ends of the springs, as shown in Figure 4, are connected with a U shaped cross bar 25, which is formed centrally with an upstanding knife edge projection 26, arranged to be seated in connection with a block 27 provided upon the lower end of a fixed depending stem 28 carried in connection with the lever element 8. By this construction it will be seen that the normal tendency and effort of the springs 24 is to lift or elevate the lever element by swinging the latter about its pivotal connection 9 with the support 11. This tendency, however, is counteracted by means to be hereinafter described, but it will be observed that when a weight is placed upon the receiver 4 the springs 24 will be stretched in resisting the tendency on the part of the weight to shift the lever element from its neutral position. This resistance may be varied by adjusting the screw 18.

The inner end of the lever element is provided with an opening 29 in which is positioned the upper end of a link 30, normally arranged to extend vertically. This link, in turn, is formed with an opening in which is positioned a block for the reception of a knife edge support 31 carried by the inner end of the lever element 8. Similarly, the lower end of the link 30 is positioned within the bifurcated inner end 32 of a lower lever element 33, also forming a part of the beam structure. The end 32 of the element 33 carries a transversely extending rigidly disposed knife edge 34, which is seated upon a block 35 arranged in an opening provided in the lower end of the links 30.

Figure 1:
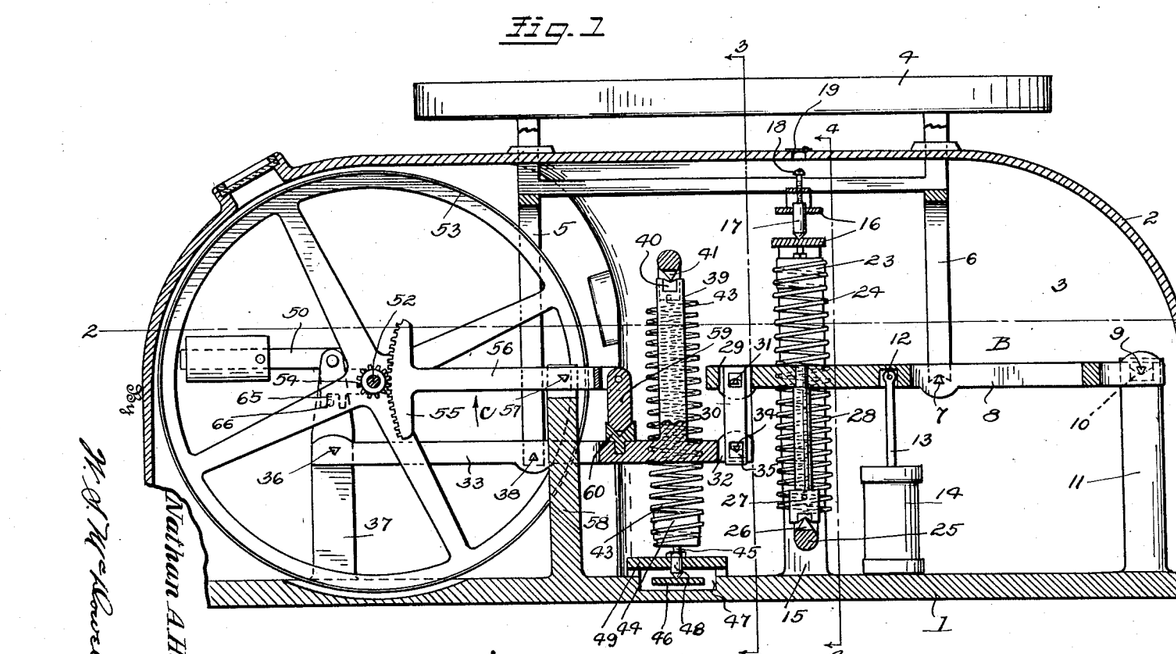
Figure 1 is a vertical longitudinal sectional view taken through a scale constructed in accordance with the present invention.
Figure 2:
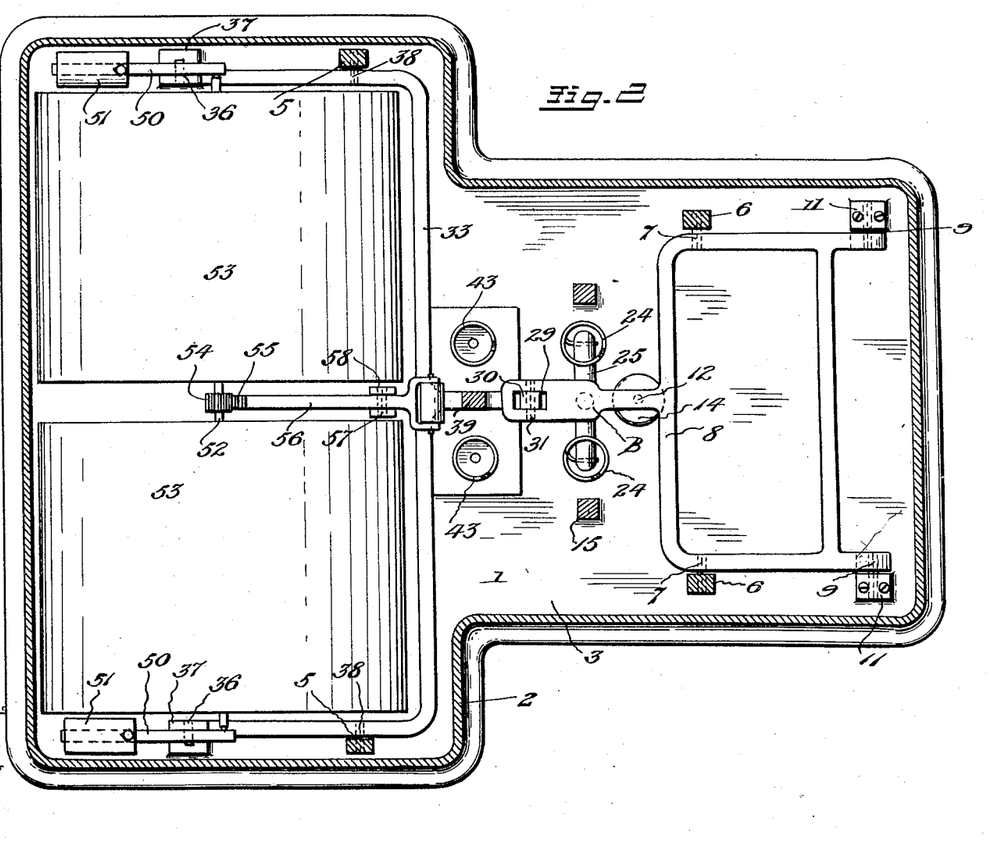
Figure 2 is a horizontal sectional view on the plane indicated by the line 2—2 of Figure 1.
Figure 3:
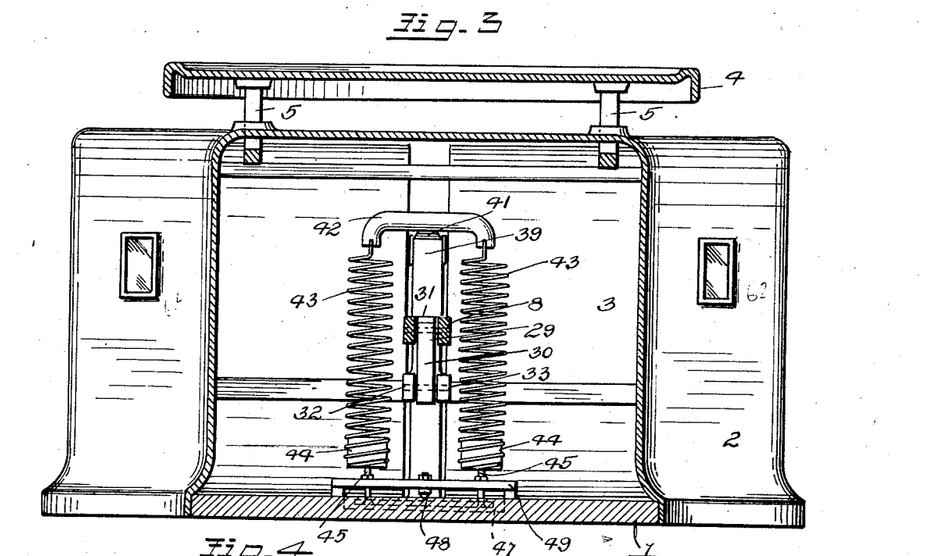
Figure 3 is a vertical transverse sectional view on the plane disclosed by the line 3—3 of Figure 1.

The lower lever element 33 is provided, as shown in Figure 2, with a yoke shaped outer end carrying transversely aligned knife edges 36, which are engaged with fulcrum supports 37 stationarily arising from the base 1. The lower ends of the weight receiver stems 5 are supported in connection with the lever element 33 by knife edges 38 and, it will be observed by reference to Figure 1, that the distance between the knife edges 36 and 38 corresponds to the distance between the knife edges 7 and 9 provided in connection with the upper lever element 8. Also, the link connection 30 is disposed equidistantly between the spaced sets of knife edges 7 and 38.

To resiliently sustain the lower lever element 33 the latter, in this instance, is provided with an upstanding stem 39, carrying at its upper end a block 40 which engages a depending knife projection 41 with a transversely extending U shaped cross bar 42. Connected with the legs of this bar are the upper ends of a pair of coiled contractile springs 43, the latter having their lower ends engaged with heads 44, carried in connection with stems 45, the latter having their lower ends connected with a transversely extending bar 46, arranged in a recess 47 in the base 1. The central portion of the bar 46 engages with a fixed stop stud 48, carried by a stationary frame 49 supported on the base. The springs 43 are thus mounted so that they normally tend to force the lever element 33 in a downward direction and it will be noted this tendency is in opposition to that established by the springs 24. Therefore, by carefully adjusting the tension of the springs 24 and 43 the two lever elements constituting the beam structure can be accurately set to maintain a neutral position and a zero reading of the indicating mechanism to be hereinafter described. The springs 24 serve to support or resist the load placed on the weight receiver, whereas the springs 43 are employed for the purpose of assisting in maintaining at all times a tension on the spring 24 so as to procure the resilient suspension if the beam structure in neutral position.

Mounted on the fulcrum supports 37 are pivoted bell crank levers 50, having their longer arms provided with adjustable weights 51, and their shorter arms formed to provide bearings for the reception of the opposite ends of a transversely disposed indicator shaft 52. Fixed to this shaft are indicator drum sections 53. Between the sections 53 the shaft 52 is provided with a pinion 54, which is maintained in engagement with a rack or segment gear 55 provided upon one end of a counter-balance arm 56. This arm carries knife edges 57 which are received by a fulcrum support 58, arising from the base 1 and at its inner end, the arm 56 carries a pivoted counter-balancing weight 59, the normal action of which being to swing the arm in the direction indicated by the arrow c, Figure 1. The neutral position, however, of the lever element 33 is such as to receive and support the weight 59. This is accomplished by providing the element 33 with a V block 60, in which the lower portion of the weight 59 is normally received.

In operation, it will be observed that when the lever element 33 is moved downwardly in response to a weight applied to the receiver 4 its movement is short or sudden, due frequently to the manner of applying the weight to the receiver. Ordinarily, this causes detrimental shock or jars to be imparted to the indicator mechanism, particularly so when positive connections are employed between the beam structure and the indicator drum. It will be observed, however, in the present invention when the beam structure is depressed it moves downwardly to a position free or independent of the arm 56. The arm 56 then responds to the influence of its weight 59 and because of the fact that it is slightly counter-balanced, the arm swings relatively slowly about its fulcrum 57, causing the turning of the drum 53, after the weight has swung to a predetermined extent it engages the block 60 and the lever 33 which, by this time, has reached a permanent position of displacement in response to the applied weight. The engagement of the weight 59 with the block 60 thus limits or arrests the swinging movement of the arm 56 and consequently brings the indicating drum to a stop so that the weight readings may be taken. Sight openings 61 are provided in the housing 2 for the scale operator, while similar openings 62 are provided, in spaced relation from the openings 61, to provide for the customer's reading. By providing the floating support, as it were, for the indicator drum proper engagement at all times is maintained between the pinion 54 and the gear 55, to the end of maintaining uniform tooth pressures and preventing undue binds and friction.

Figure 6:
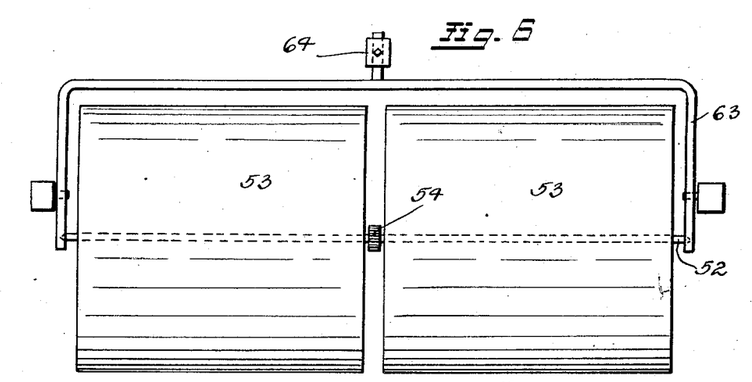
Figure 6 is a plan view showing a slightly modified form of frame for effecting what may be termed the floating support of the indicator structure.
Figure 7:
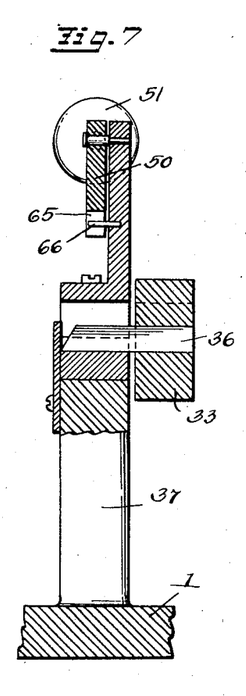
Figure 7 is a vertical sectional view showing the pivotal support for the lower lever of the beam structure.

In Figure 6 the drum structure is supported by means of a yoke shaped bar 63, with which is connected a single weight 64. This construction may be used as an alternative of that disclosed in Figures 1 and 2, where the casing is of a size and form to permit of this being done. Also, the bell crank levers 50 are provided with bifurcated portions 65 arranged for cooperation with fixed pins 66, carried by the supports 37. The pins 66 serve to limit the oscillatory movement of the bell cranks and the associated drum mechanism.

Figure 9:
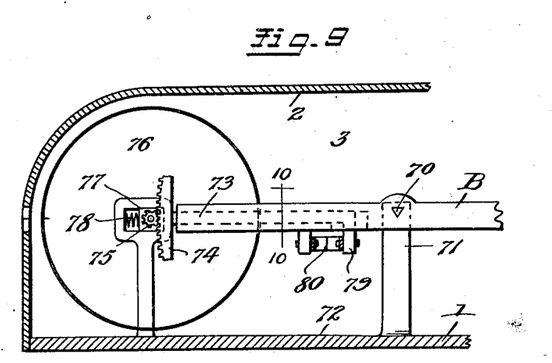
Figure 9 is a vertical sectional view disclosing a slightly modified form of apparatus wherein a thermostatic control is employed for governing the effective length of the beam structure.
Figure 10:
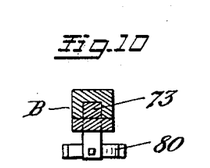
Figure 10 is a detail cross-sectional view on the line 10—10 of Figure 9.

In Figure 9 there has been disclosed a slightly modified form of the invention wherein the beam structure B, or an element corresponding to the arm 56, is pivoted as at 70 on a support 71 arising from the base 72. For convenience the element will be referred to as the beam and, as shown, the outer end thereof is provided with a longitudinal opening in which is slidably mounted the shank 73 of a segmental gear 74. This gear engages with the pinions 75 mounted on the shaft of an indicating drum 76. In this instance the shaft is mounted in bearings 77, each of which containing a spring 78, normally set to urge the bearings 77 so as to maintain the pinions 75 in engagement with the teeth of the segment gear 74. The shank 73 terminates in a downwardly directed portion 79 which extends to an exterior position with respect to the beam and has its lower end connected with a thermostat 80, so arranged that as the temperature increases the gear is moved inwardly by the expanding thermostat, thereby shortening the beam structure to compensate for the modulus of elasticity of the springs used in balancing the beam. Conversely, when the temperature falls the thermostat contracts so as to lengthen the effective length of the beam, so that the shorter throw of the springs may be taken care of with accuracy.

Figure 11:
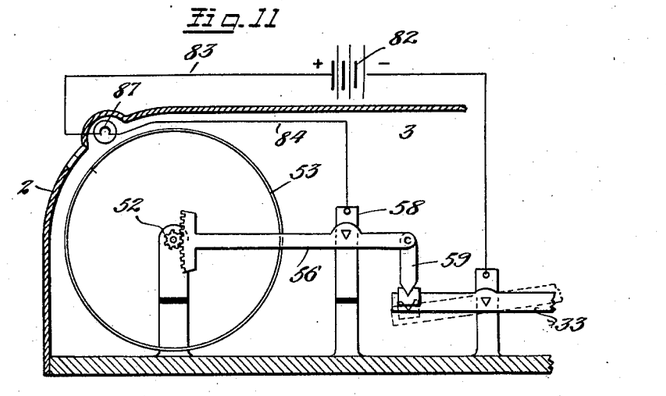
Figure 11 is a view disclosing the circuit provided for illuminating the indicating mechanism.

In Figure 11 the casing or housing 2 has been shown as provided with an electric lamp 81 connected with a source of electrical energy 82 by means of a wire 83. From the negative side of the lamp filament a wire 84 extends to the support 58, and the current passes through the arm 56, the weight 59 to the lower lever element 33, returning to the source of energy by a wire 85. Thus, when the scale is in neutral position the lamp 81 is energized. However, upon the placing of a weight on the scale, the lower lever element 33 moves to a position independent of the weight 59, thereby interrupting the circuit until after the drum comes to a state of rest, wherein the circuit is again completed permitting the indicating mechanism to be read.

In view of the foregoing it will be seen that the present invention provides a scale wherein all of the advantageous features of construction and operation are, among others, present. While I have set forth what I consider to be the preferred embodiment of the invention, never-the-less, it will be understood that the invention is not limited to the structural details above set forth but may be modified from time to time in accordance with the dictates of practice without departing from the spirit and scope of the invention as the latter is set forth and defined in the following claims.

What is claimed is:

1. In a scale, a compound beam comprising a pair of lever elements pivotally mounted at their outer ends, a link connection between the adjacent inner ends of said elements, springs connected with said elements and operating normally in opposed relation upon said lever elements to produce substantially balanced tensile forces upon said links, a weight receiver supported from said elements and an indicator mechanism responsive to the deflection of said lever elements from neutral position.

2. In a scale, a compound beam comprising a pair of longitudinally extending lever elements pivotally mounted at their outer ends, one of said elements being disposed in a plane above the other element, a substantially vertical link connection between the inner ends of said elements providing a flexible connection therebetween, springs connected with the upper lever element and tending to swing the latter in an upward direction, springs connected with the lower lever element and tending to swing the latter in a downward direction, a weight receiver supported by said elements, and an indicating mechanism responsive to the deflection of said lever elements from neutral position.

3. A compound scale beam comprising a pair of longitudinally extending lever elements, pivotal supports for the outer ends of said elements, a link connection between the inner ends of said elements, and spring means connected with said elements and operating normally in opposed relation thereon to produce substantially balanced central forces upon said link connections.

4. A compound scale beam comprising a pair of lever elements, one of said elements being disposed in a horizontal plane above the other element, pivotal supports for the outer ends of said elements, a substantially vertically disposed link connection between the inner end of said elements, and spring means cooperative with said elements and operating normally in opposed relationship thereon to produce substantially balanced tensile forces upon said link.

5. In a scale, a compound beam comprising a pair of lever elements, one of said elements being disposed in a horizontal plane above the other element, pivotal supports for the outer ends of said elements, a flexible connection between the inner ends of said elements, a spring cooperative with the lower of said elements and tending to move the latter in a downward direction, a second spring cooperative with the upper of said elements and tending to swing the latter in an upward direction, and means for varying the tension of at least one of said springs.

6. In a scale, a compound beam structure comprising a pair of lever elements, one of said elements being arranged in a plane above the other element, pivotal supports for the outer ends of said elements, a link connection between the inner ends of said elements, a pair of coil springs cooperating with the upper of said elements and tending normally to rock the latter in an upward direction, a pair of coil springs cooperative with the lower of said elements and tending normally to rock the latter in a downward direction, means for adjusting the tension of said first named springs, and a weight receiver pivotally supported by said lever elements.

7. In a scale, a base, a pair of longitudinally spaced pivotal supports arising from said base, a beam structure including a pair of opposed lever elements having their outer ends pivotally mounted upon said supports, one of said lever elements being arranged in a plane above the other element, a link connection between the inner ends of said elements for pivotally uniting the latter, one set of springs cooperative with the upper of said elements and tending to oscillate the latter normally in an upward direction, a second set of springs cooperative with the lower of said elements and tending normally to rock the latter in a downward direction, adjusting means for balancing the tension of said springs and said lever elements to maintain the latter in neutral position, a weight receiver carried by said elements, and an indicating mechanism operated by the movement of said elements.

8. In a scale, an indicating mechanism including a rotatable drum structure arranged for rotation about a longitudinal axis, a pinion fixed to an axial portion of said drum structure, a swinging segment gear meshing with said pinion, and a movable support for said drum structure serving to maintain said gear and pinion in meshing engagement at uniform pressures.

9. In a scale, an indicating mechanism including a rotatable drum, an axial support for said drum, a pair of pivotally mounted weighted arms in which the ends of said support are journaled, a pinion on said support, and a pivotally mounted toothed segment meshing with said pinion.

10. In a scale, an indicating mechanism including a rotatable drum, an axial support for said drum, floating bearings for the ends of said support, a pivoted beam, and motion transmitting means between said beam and said support.

11. In a scale, a pivoted beam structure, a rotatable drum, an axial support for said drum, a pinion on said support, a pivoted arm provided at one end with a segmental gear meshing with said pinion, and a weight provided on the other end of said arm and arranged to follow the movement of said beam.

12. In a scale, a pivoted beam, a weight indicating mechanism including a rotatable drum, a pivoted arm for rotating said drum, and a weight provided upon one end of said arm and arranged to follow the movement and positions of said beam, said weight when unsupported being capable of operating said arm against the resistance offered thereto by said drum structure.

13. In a scale, a pivoted beam, spring means for maintaining said beam in a neutral position, and to yieldably resist deflection thereof from neutral position, a rotatable weight indicator, a pivotally mounted weighted arm for operating said indicator, and stop means carried by said beam for limiting the swinging movement on the part of said arm.

14. In a scale, a pivotally mounted beam, an indicating mechanism including a rotatable drum, means for maintaining said beam structure normally in a neutral position, motion transmitting means between said beam structure and said indicating mechanism by which the indicating mechanism is moved proportionately to the deflection of said beam structure from neutral position, means for illuminating said drum structure, including a circuit for energizing said lamp when said beam is in neutral position, to break said circuit when said beam is partially deflected from neutral and to re-establish the circuit when said beam reaches a final position of deflection.

15. In a scale, a pivoted beam structure, an indicating mechanism including a rotatable drum, a longitudinal shaft for supporting said drum, movable bearings in which the ends of said shaft are mounted, a pinion on said shaft, a gear carried by the outer end of said beam structure and in engagement with said pinion, and thermostatic means for effecting variations in the operating position of said gear.

16. In a scale, a pivoted beam provided with a longitudinally extending socket, a gear provided at one end of said beam and formed with a shank slidably received within said socket, and thermostatically operated means for sliding said gear and the shank portion thereof in said socket.

17. In a scale, a pivotally mounted beam, an indicating mechanism, an operating appliance carried by one end of said beam structure and movable with respect thereto, and thermostatic means for varying the positions of said operating appliance, said operating appliance being of segmental construction.

18. In a scale, a base, weight sustaining lever mechanism mounted on said base, an indicating drum rotatably mounted on said base in the horizontal plane of said lever mechanism but with the axis of the drum extending substantially perpendicularly to the longitudinal axis of said lever mechanism, and a housing covering said lever mechanism and said drum, said housing being provided adjacent to said drum with a longitudinally extending sight opening disposed on one side of the axis of said drum and with a pair of spaced sight openings on the opposite side of the axis of said drum.

19. In a scale, a base, a compound beam comprising a pair of longitudinally extending lever elements mounted on said base, a load receiver including a weight platter supported by said beam, an indicating drum mounted on said base and positioned so that its longitudinal axis is disposed substantially perpendicularly to the longitudinal axis of one of said lever elements, said drum axis and last mentioned lever element occupying substantially the same horizontal plane the drum and beam at one end of said beam structure, motion transmitting means between said drum and beam, and a housing covering said drum and beam and disposed below said weight platter.

20. In a scale, a base, a movable beam comprising a pair of longitudinally extending lever elements, a weight receiver supported by said beam, an indicating drum mounted for rotation on said base and arranged at one end of said beam, the longitudinal axis of said drum being disposed substantially perpendicularly to the longitudinal axis of one of said lever elements, the longitudinal axes of the latter mentioned lever element and said drum being arranged in substantially the same horizontal plane, and a housing mounted on said base and arranged to cover both the beam and drum.

21. In a scale, a base, a beam mechanism mounted on said base, a casing covering said base and said beam mechanism, a weight receiver supported by said beam mechanism and extending thru the top of said casing, an indicating drum rotatably mounted within one end of said casing and arranged below said weight receiver, said casing adjacent to said drum being provided with a sight opening disposed on one side of the axis of said drum and located at the top of the casing immediately to one side of a vertical plane passing thru said drum axis and a second sight opening formed in said casing on the opposite side of the vertical plane passing thru said drum axis, said sight openings permitting said drum to be viewed from either end of said scale.

22. In a scale, a substantially T shaped base, a casing conforming to the outline configuration of said base, a compound beam mechanism mounted on said base within said casing and comprising a pair of lever elements, one of said elements being arranged in a plane above the other element, a weight receiver supported by said beam mechanism and projecting vertically thru the top of said casing, an indicating drum within said casing arranged so that its longitudinal axis extends perpendicularly to the upper of said lever elements and being further arranged to occupy the wider area of said base, and said casing being provided with a plurality of sight openings to permit of the reading of said drum from either end of said scale, said openings being disposed on opposite sides of a vertical plane passing thru the axis of said drum.

In testimony whereof I affix my signature.

NATHAN A. HALLWOOD.